US009600905B2

(12) United States Patent
Yokomizo

(10) Patent No.: US 9,600,905 B2
(45) Date of Patent: *Mar. 21, 2017

(54) COLOR-SCHEME DETERMINATION DEVICE, COLOR-SCHEME DETERMINATION METHOD, AND COLOR-SCHEME DETERMINATION PROGRAM

(71) Applicant: Azusa Yokomizo, Tokyo (JP)

(72) Inventor: Azusa Yokomizo, Tokyo (JP)

(73) Assignee: NEC Corporation, Tokyo (JP)

( * ) Notice: Subject to any disclaimer, the term of this patent is extended or adjusted under 35 U.S.C. 154(b) by 138 days.

This patent is subject to a terminal disclaimer.

(21) Appl. No.: 14/378,021

(22) PCT Filed: Nov. 22, 2012

(86) PCT No.: PCT/JP2012/007525
§ 371 (c)(1),
(2) Date: Aug. 11, 2014

(87) PCT Pub. No.: WO2013/128522
PCT Pub. Date: Sep. 6, 2013

(65) Prior Publication Data
US 2015/0002530 A1 Jan. 1, 2015

(30) Foreign Application Priority Data
Feb. 29, 2012 (JP) ................. 2012-043638

(51) Int. Cl.
*G06T 11/00* (2006.01)
*H04N 1/46* (2006.01)
*G06T 7/40* (2006.01)

(52) U.S. Cl.
CPC ............ *G06T 11/001* (2013.01); *G06T 7/408* (2013.01); *H04N 1/46* (2013.01)

(58) Field of Classification Search
CPC ................. G09G 5/02; G09G 2320/06; G09G 2320/0666; G09G 5/06; H04N 1/60; G06T 11/001; G06T 7/408; G06K 9/00234

See application file for complete search history.

(56) References Cited

U.S. PATENT DOCUMENTS

| 8,736,634 B2* | 5/2014 | Yokomizo ............. G06T 11/001 345/589 |
| 2006/0044324 A1 | 3/2006 | Shum et al. |
| 2007/0201749 A1 | 8/2007 | Yamauchi et al. |

FOREIGN PATENT DOCUMENTS

| EP | 0680018 A2 | 11/1995 |
| EP | 2284799 A1 | 2/2011 |

(Continued)

OTHER PUBLICATIONS

Kikuta, Yuji et al. "Information Visualization and its Evaluation Using Importance and User Visibility," IEICE (the Institute of Electronics, Information and Communication Engineers) Technical Report, DE Jun. 2000 (May 2000) pp. 41-48.

(Continued)

*Primary Examiner* — Antonio A Caschera
(74) *Attorney, Agent, or Firm* — Wilmer Cutler Pickering Hale and Dorr LLP

(57) ABSTRACT

An input unit receives designation of an evaluation target screen by a user. A color-scheme information acquisition unit acquires color-scheme information. An attractiveness calculation unit calculates an attractiveness by using the color-scheme information. An importance degree storage unit holds importance degree information representing a relative degree of importance of each of the used colors and corresponding to information for which each of the used colors is used. A color-scheme appropriateness judgment unit calculates ordinal rank of the importance degree infor- (Continued)

mation associated with each of the used colors, calculates ordinal rank of the attractiveness associated with each of the used colors, and outputs a judgment result indicating whether or not the ordinal rank of the importance degree information associated with each of the used colors coincides with the ordinal rank of the attractiveness associated with the used color. An output unit displays the judgment result.

19 Claims, 11 Drawing Sheets

(56) References Cited

FOREIGN PATENT DOCUMENTS

| JP | H07-306935 A | 11/1995 |
|----|--------------|---------|
| JP | H09-081761 A | 3/1997 |
| JP | 2006-107905 A | 4/2006 |
| JP | 2008-165700 A | 7/2008 |
| JP | 2009-160269 A | 7/2009 |
| JP | 2009-260530 A | 11/2009 |
| WO | WO-2006-082979 A1 | 8/2006 |
| WO | WO-2008/013502 A1 | 1/2008 |

OTHER PUBLICATIONS

Tanaka, Shoji et al. "An Attractiveness Evaluation Model Based on the Physical Features of Image Regions," The Transactions of the Institute of Electronics, Information and Communication Engineers, May 2000, vol. J83-A, No. 5, pp. 576-588.
International Search Report, corresponding to PCT/JP2012/007525, dated Dec. 25, 2012, 2 pages.
Barbara J. Meier "ACE: A Color Expert System for User Interface Design", XP-002639819, Proceedings of the ACM Siggraph Symposium on User Interface Software ACM New York, NY USA, Jan. 1, 1988, pp. 117-128.
Extended European Search Report issued in corresponding European Application No. 12870253.7, dated Mar. 16, 2016, 4 pages.
Japanese Office Action issued by the Japan Patent Office for Application No. 2014-501841 dated Jul. 26, 2016 (6 pages).
Saito, H., et al., "Re-Coloring systems based on color conspicuity," NTT Cyber Solutions Laboratories, Proceedings of the Human Interface Symposium, 9 pages (2010).

* cited by examiner

| ID | COLOR (RGB) | AREA (px) | ATTRIBUTE | SCREEN |
|---|---|---|---|---|
| 0 | #FFFFFF | 4900 | BACKGROUND | MAP 30 |
| 1 | #FF0000 | 400 | OTHER | MAP 30 |
| 2 | #0000FF | 1200 | OTHER | MAP 30 |
| 3 | #FF6600 | 3500 | OTHER | MAP 30 |

FIG. 5

| ID | COLOR (RGB) | CHARACTERISTIC ATTRACTIVENESS | HETEROGENEOUS ATTRACTIVENESS | ATTRACTIVENESS | SCREEN |
|---|---|---|---|---|---|
| 1 | #FF0000 | 3.0 | 1.7 | 4.7 | MAP 30 |
| 2 | #0000FF | 2.7 | 2.1 | 4.8 | MAP 30 |
| 3 | #FF6600 | 2.3 | 0.6 | 2.9 | MAP 30 |

FIG. 6

| ID | COLOR (RGB) | ORDINAL RANK OF ATTRACTIVENESS | SCREEN |
|---|---|---|---|
| 1 | #FF0000 | 2 | MAP 30 |
| 2 | #0000FF | 1 | MAP 30 |
| 3 | #FF6600 | 3 | MAP 30 |

FIG. 7

| ID | COLOR (RGB) | IMPORTANCE DEGREE | MEANING OF INFORMATION | SCREEN |
|---|---|---|---|---|
| 1 | #FF0000 | 100 | DESTINATION | MAP 30 |
| 2 | #0000FF | 80 | NEAREST STATION & RAILWAY | MAP 30 |
| 3 | #FF6600 | 20 | ROAD | MAP 30 |

FIG. 8

| ID | COLOR (RGB) | ORDINAL RANK OF IMPORTANCE DEGREE | SCREEN |
|---|---|---|---|
| 1 | #FF0000 | 1 | MAP 30 |
| 2 | #0000FF | 2 | MAP 30 |
| 3 | #FF6600 | 3 | MAP 30 |

FIG. 9

| ID | COLOR (RGB) | VALUE OF ATTRACTIVENESS | ORDINAL RANK OF ATTRACTIVENESS | VALUE OF IMPORTANCE DEGREE | ORDINAL RANK OF IMPORTANCE DEGREE | JUDGMENT RESULT | SCREEN |
|---|---|---|---|---|---|---|---|
| 1 | #FF0000 | 4.7 | 2 | 100 | 1 | INAPPROPRIATE | MAP 30 |
| 2 | #0000FF | 4.8 | 1 | 80 | 2 | INAPPROPRIATE | MAP 30 |
| 3 | #FF6600 | 2.9 | 3 | 20 | 3 | APPROPRIATE | MAP 30 |

91

| ID (111) | COLOR (RGB) (112) | IMPORTANCE DEGREE (113) | MEANING OF INFORMATION (114) | SCREEN (115) |
|---|---|---|---|---|
| 1 | #FF0000 | 80 | DESTINATION | MAP 30 |
| 2 | #0000FF | 100 | NEAREST STATION & RAILWAY | MAP 30 |
| 3 | #FF6600 | 20 | ROAD | MAP 30 |

| ID | COLOR (RGB) | ORDINAL RANK OF IMPORTANCE DEGREE | SCREEN |
|---|---|---|---|
| 1 | #FF0000 | 2 | MAP 30 |
| 2 | #0000FF | 1 | MAP 30 |
| 3 | #FF6600 | 3 | MAP 30 |

| ID | COLOR (RGB) | VALUE OF ATTRACTIVENESS | ORDINAL RANK OF ATTRACTIVENESS | VALUE OF IMPORTANCE DEGREE | ORDINAL RANK OF IMPORTANCE DEGREE | ORDINAL RANK COINCIDENCE | ATTRACTIVENESS RATIO | JUDGMENT RESULT | SCREEN |
|---|---|---|---|---|---|---|---|---|---|
| 1 | #FF0000 | 4.7 | 2 | 80 | 2 | YES | 0.059 | APPROPRIATE | MAP 30 |
| 2 | #0000FF | 4.8 | 1 | 100 | 1 | YES | 0.048 | APPROPRIATE | MAP 30 |
| 3 | #FF6600 | 2.9 | 3 | 20 | 3 | YES | 0.145 | INAPPROPRIATE | MAP 30 |

FIG. 16

| ID | COLOR (RGB) IN ORIGINAL PLAN | COLOR (RGB) IN IMPROVEMENT PLAN | SCREEN |
|---|---|---|---|
| 1 | #FF0000 | #0000FF | MAP 30 |
| 2 | #0000FF | #FF0000 | MAP 30 |
| 3 | #FF6600 | #FF6600 | MAP 30 |

FIG. 17

| ID | COLOR (RGB) IN ORIGINAL PLAN | COLOR (RGB) IN IMPROVEMENT PLAN | SCREEN |
|---|---|---|---|
| 1 | #FF0000 | #FF1919 | MAP 30 |
| 2 | #0000FF | #0707F9 | MAP 30 |
| 3 | #FF6600 | #FF6600 | MAP 30 |

COLOR-SCHEME DETERMINATION DEVICE, COLOR-SCHEME DETERMINATION METHOD, AND COLOR-SCHEME DETERMINATION PROGRAM

CROSS-REFERENCE TO RELATED APPLICATIONS

The present application is a national stage application of International Application No. PCT/JP2012/007525 entitled "Color-Scheme Determination Device, Color-Scheme Determination Method, and Color-Scheme Determination Program," filed on Nov. 22, 2012, which claims the benefit of priority from Japanese Patent Application No. JP2012-043638, filed on Feb. 29, 2012, the disclosures of which are incorporated herein in their entirety by reference thereto.

TECHNICAL FIELD

The present invention relates to a color-scheme determination device for judging the appropriateness of overall coloration balance on a screen, and in particular, to a color-scheme determination device operating in consideration of the characteristics of the human visual sense.

BACKGROUND ART

In the designing of a screen, making the design so that information important to the user stands out on the screen is a basic technique for creating an easy-to-use screen. As an element influencing the stand-out degree (degree of standing out) of the information, the color can be taken as an example as well as the size and the layout. Successively assigning loud colors (from the loudest one) to the information in descending order of the importance of the information is a commonly-used method. However, as the amount or the number of types/pieces of information to be displayed at the same time increases substantially and the number of colors necessary for expressing the information increases accordingly, just employing the above method (successively assigning loud colors to the information in descending order of the importance of the information) sometimes fails to let each type/piece (hereinafter referred to simply as "type") of stand out exactly according to the intention of the designer.

For example, although red is a color that easily stands out as a single color, the stand-out degree of the red color on the whole screen (when the whole screen is viewed) drops when the red color is used for a lot of elements on the screen and when similar colors (magenta, orange, etc.) are also used for other types of information. As above, determining the color-scheme in consideration of the color balance on the whole screen is essential for letting each type of information stand out exactly according to the intention of the designer.

However, determining the color-scheme in consideration of the color balance on the whole screen or making an evaluation on whether the color-scheme has been made in consideration of the balance on the whole screen or not is difficult for designers not having sufficient knowledge of colors and design (difficult unless the designer has expert knowledge).

Non-patent Literature 1 describes a technology for evaluating the method for setting the color, the area, etc. of each type of information when multiple types of information differing in the priority are displayed on the screen. With this technology, the appropriateness of the display (visualization) on the screen as a whole can be evaluated in terms of a value called "visualization achievement value (display achievement level)" in consideration of the degree of attracting visual attention and the priority of each type of information on the screen.

A technology described in Non-patent Literature 2 considers that the stand-out degree (degree of standing out) of each color used on the screen can be calculated based on an attractiveness evaluation model (attractiveness evaluation model) that takes into account a characteristic attractiveness (as the degree of attracting visual attention as a single color) and a heterogeneous attractiveness (as the degree of attracting visual attention as compared with other colors). By using this technology, the stand-out degree of each color in consideration of the balance on the whole screen can be calculated.

Patent Literature 1 describes a technology for controlling the way of letting each region in a document stand out by varying the color and the hatching density of each region depending on the area and the degree of importance of the region. With this technology, the coloration can be performed in a simple and easy manner, by changing the saturation and the shade (elements determining the degree of standing out as a single color) depending on the area and the degree of importance of each region.

CITATION LIST

Patent Literature

PTL 1: JP-09-081761-A

Non-Patent Literature

Non-patent Literature 1: Yuji Kikuta, Sozo Inoue, Mizuho Iwaihara, "Information Visualization and its Evaluation using Importance and User Visibility", IEICE (the Institute of Electronics, Information and Communication Engineers) Technical Report, DE2000-6 (2000-05), pp. 41-48

Non-patent Literature 2: Shoji Tanaka, Seiji Inokuchi, Yuichi Iwadate, Ryohei Nakatsu, "An Attractiveness Evaluation Model Based on the Physical Features of Image Regions", The Transactions of the Institute of Electronics, Information and Communication Engineers, May 2000, Vol. J83-A, No. 5, pp. 576-588

SUMMARY OF THE INVENTION

Technical Problem

In the technology described in the Non-patent Literature 1, the appropriateness of the display (visualization) on the screen as a whole is evaluated in terms of a value called "visualization achievement value (display achievement level)". However, appropriateness of the display of each type of information on the screen is not evaluated. Therefore, there is a problem that the technology cannot clarify changing the color of which type of information leads to improvement of the evaluation value.

The technology described in the Non-patent Literature 2 is capable of evaluating the stand-out degree (degree of standing out) of each used color (color used on the screen) on the whole screen. However, since the meaning and the degree of importance of each type of information on the screen (to which each color has been assigned) are not taken into consideration, there is a problem that it is impossible to judge whether or not each color is standing out appropriately corresponding to the meaning and the degree of importance of each type of information in the image.

In the technology described in the Patent Literature 1, each region in a document is assigned a color corresponding to the degree of importance of the region in the document, in consideration of the stand-out degree (degree of standing out) of each color as a single color. Since the balance when the document is viewed as a whole is not take into consideration even though the stand-out degree of each region as a single region is adjusted, there is a problem that there is a possibility that the stand-out degree intended for each region cannot be realized in the document. Further, since evaluation of the result of the coloration is not carried out, there is a problem that achievement of an actually appropriate color-scheme is not guaranteed.

It is therefore the primary object of the present invention to provide a color-scheme determination device with which even people not expert in colors and screen design can evaluate whether or not each type/piece of information constituting a screen has been colored to stand out on the whole screen appropriately corresponding to the degree of importance of the information.

Solution to Problem

A color-scheme determination device in accordance with the present invention includes: an input unit which receives designation of an evaluation target screen by a user; a color-scheme information acquisition unit which acquires color-scheme information including data regarding all colors used for information displayed on the evaluation target screen; an attractiveness calculation unit which calculates an attractiveness, representing the degree of attracting visual attention, in regard to each of the used colors by using the color-scheme information; an importance degree storage unit which holds importance degree information representing a relative degree of importance of each of the used colors and corresponding to the information for which each of the used colors is used; a color-scheme appropriateness judgment unit which calculates ordinal rank of the importance degree information associated with each of the used colors based on the magnitude of the importance degree information, calculates ordinal rank of the attractiveness associated with each of the used colors based on the magnitude of the attractiveness, and outputs a judgment result indicating whether or not the ordinal rank of the importance degree information associated with each of the used colors coincides with the ordinal rank of the attractiveness associated with the used color; and an output unit which displays the judgment result.

A color-scheme determination method in accordance with the present invention includes: receiving designation of an evaluation target screen by a user; acquiring color-scheme information including data regarding all colors used for information displayed on the evaluation target screen; calculating an attractiveness, representing the degree of attracting visual attention, in regard to each of the used colors by using the color-scheme information; holding importance degree information representing a relative degree of importance of each used color and corresponding to information for which each used color is used; calculating ordinal rank of the importance degree information associated with each of the used colors based on the magnitude of the importance degree information; calculating ordinal rank of the attractiveness associated with each of the used colors based on the magnitude of the attractiveness; outputting a judgment result indicating whether or not the ordinal rank of the importance degree information associated with each used color coincides with the ordinal rank of the attractiveness associated with the used color; and displaying the judgment result.

A color-scheme determination program in accordance with the present invention causes a computer to execute: an input process of receiving designation of an evaluation target screen by a user; a color-scheme information acquisition process of acquiring color-scheme information including data regarding all colors used for information displayed on the evaluation target screen; an attractiveness calculation process of calculating an attractiveness, representing the degree of attracting visual attention, in regard to each of the used colors by using the color-scheme information; an importance degree storage process of holding importance degree information representing a relative degree of importance of each used color and corresponding to information for which each used color is used; a color-scheme appropriateness judgment process of calculating ordinal rank of the importance degree information associated with each of the used colors based on the magnitude of the importance degree information, calculating ordinal rank of the attractiveness associated with each of the used colors based on the magnitude of the attractiveness, and outputting a judgment result indicating whether or not the ordinal rank of the importance degree information associated with each used color coincides with the ordinal rank of the attractiveness associated with the used color; and an output process of displaying the judgment result.

Advantageous Effect of Invention

According to the present invention, even people not expert in colors and screen design are enabled to evaluate whether or not each type/piece of information constituting a screen has been colored to stand out on the whole screen appropriately corresponding to the degree of importance of the information.

BRIEF DESCRIPTION OF DRAWINGS

FIG. 5 It depicts an example of a data structure (including attractiveness of the colors) outputted by an attractiveness calculation unit.

FIG. 6 It depicts an example of a data structure (including ordinal ranks of the attractiveness of the colors) generated by a color-scheme appropriateness judgment unit.

FIG. 7 It depicts an example of a data structure (including importance degree information on the colors) held by an importance degree storage unit.

FIG. 8 It depicts an example of a data structure (including ordinal ranks of importance degrees of the colors) generated by the color-scheme appropriateness judgment unit.

FIG. 9 It depicts an example of a data structure (including result of judgment) outputted by the color-scheme appropriateness judgment unit.

FIG. 13 It depicts another example of the data structure (including the result of the judgment) outputted by the color-scheme appropriateness judgment unit.

FIG. 16 It depicts showing an example of a data structure (including contents of improvement) outputted by an improvement plan generation unit.

FIG. 17 It depicts another example of the data structure (including the contents of the improvement) outputted by the improvement plan generation unit.

DESCRIPTION OF EMBODIMENTS

<First Exemplary Embodiment>

Figure 1:
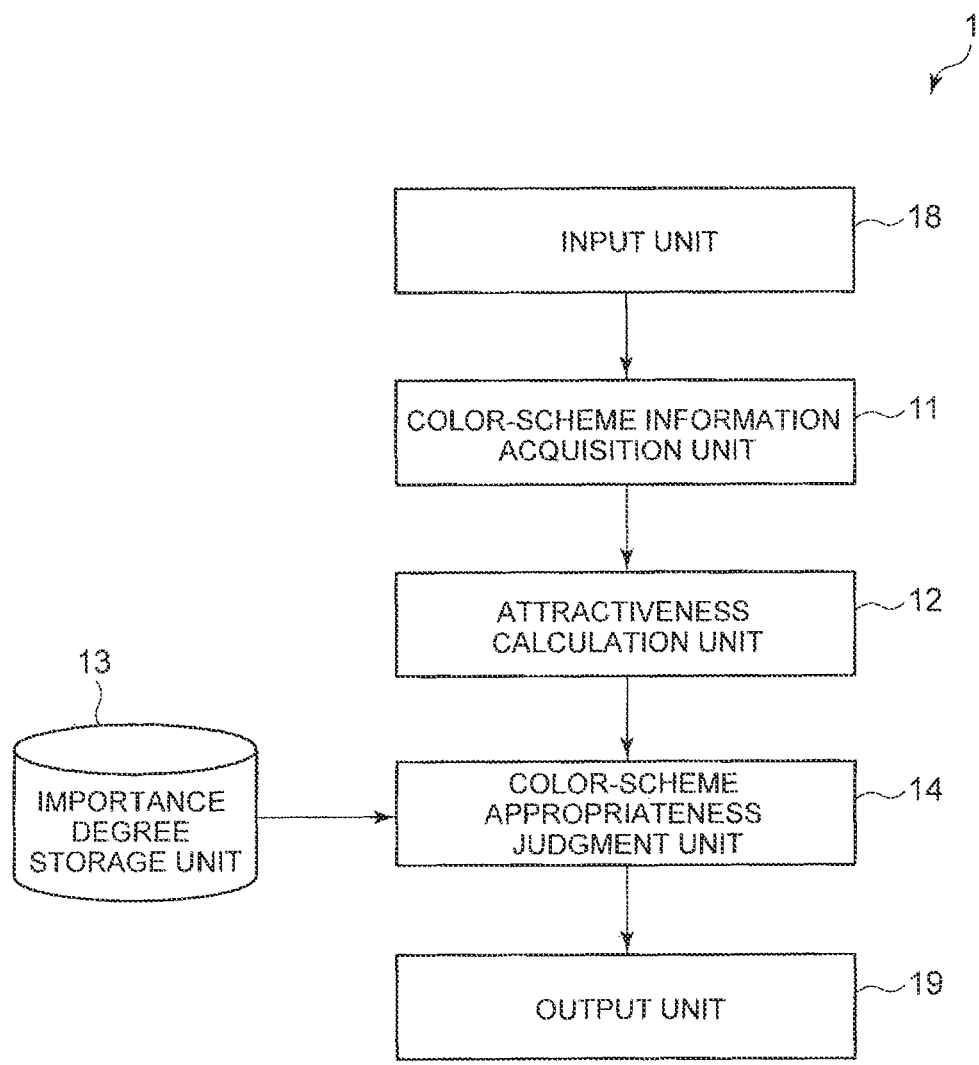
FIG. 1 It depicts the configuration of a color-scheme determination device in accordance with a first exemplary embodiment of the present invention.

A color-scheme determination device in accordance with a first exemplary embodiment (exemplary embodiment 1) of the present invention will be described in detail below referring to figures. FIG. 1 is a block diagram showing the configuration of the color-scheme determination device according to this exemplary embodiment. As shown in FIG. 1, the color-scheme determination device 1 of this exemplary embodiment includes a color-scheme information acquisition unit 11, an attractiveness calculation unit 12, an importance degree storage unit 13, a color-scheme appropriateness judgment unit 14, an input unit 18, and an output unit 19.

The color-scheme information acquisition unit 11 acquires color-scheme information indicating all colors used on an evaluation target screen and the area of each of the colors from the evaluation target screen specified by the user of the color-scheme determination device 1 (hereinafter referred to simply as "the user") through the input unit 18. In the following explanation, each color is expressed by a color notation method based on an RGB value using hexadecimal numbers (e.g., "#FF0000"). However, other color notation methods may also be used as long as the color can be uniquely determined. While the area is expressed by using the number of pixels (e.g., "500px") in the following explanation, other methods may also be used for expressing the area. The color-scheme information acquisition unit 11 determines a background color as a color having the largest area among the acquired colors. The determination of the background color may also be made by the user through the input unit 18.

The attractiveness calculation unit 12 calculates an attractiveness of each color other than the background color by using color-scheme information outputted by the color-scheme information acquisition unit 11 and information indicating which color corresponds to the background. The attractiveness is a value representing the degree of attracting visual attention of a human seeing each color on the evaluation target screen. In other words, the attractiveness is a value evaluating the stand-out degree (degree of standing out) of each color when the screen is viewed as a whole. Specifically, the attractiveness is a value determined in consideration of the degree of attracting visual attention as a single color and the degree of attracting visual attention as compared with other colors used on the same screen.

Next, a method for calculating the attractiveness will be explained below. As described in the Non-patent Literature 2, the attractiveness calculation unit 12 converts each color into values (coordinates) in the HLS color model and then calculates values representing the degree of attracting visual attention as a single color (stand-out degree He due to the hue H of the target color and stand-out degree R due to the lightness L of the target color) for each target color according to the expressions (1)-(3) shown below. Then, the summation PC of the stand-out degree He, the stand-out degree R and the saturation S of the target color is calculated according to the following expression (4), for example:

stand-out degree due to hue H $$He=|1-(H/\pi)| \quad (1)$$

stand-out degree due to lightness L $$R=L^m+k|L-L_B|^n \; L \geq L_B \quad (2)$$

$$R=L^m-k|L-L_B|^n \; L < L_B \quad (3)$$

where $L_B$ represents the lightness value of the background color in the HLS color model, and k, m and n are constants (e.g., k=0.65, m=0.4, n=0.2).

degree of attracting visual attention as a single color $$PC=He+R+S \quad (4)$$

The degree of attracting visual attention as compared with other colors used on the same screen is determined by, for example, converting each color into values (coordinates) in the CIEL*a*b* color system and then calculating the value HC in the following expression (5) by using a color difference d defined as the distance from the average color to each color in the color space as described in the Non-patent Literature 1: The values (L*, a*, b*) of the average color are calculated by, for example, multiplying each of the L*, a* and b* values of each color by the area of the use of the color having the values, adding up the multiplied values for all the colors, and dividing the sums by the total area. The value HC can be calculated with higher accuracy by considering the area in the calculation of the average color.

degree of attracting visual attention as compared with other colors used on the same screen $$HC=|(d-d_m)/\text{std}| \quad (5)$$

where $d_m$ represents the average value of the color differences d and std represents the standard deviation of the color differences d.

The attractiveness is calculated by, for example, directly adding up the value PC of the degree of attracting visual attention as a single color and the value HC of the degree of attracting visual attention as compared with other colors used on the same screen. The attractiveness calculation unit 12 may also employ other methods for the calculation of the attractiveness, such as performing the addition after multiplying each of the values PC and HC by a prescribed coefficient.

The importance degree storage unit 13 holds information on the colors on the evaluation target screen other than the background color and an importance degree (degree of importance) which has been set for each of the colors. The information on the importance degree is expressed as a score ("100 points", "80 points", "20 points", etc.). The importance degree has been set in consideration of the meaning of information to which each color has been assigned, from the viewpoint of importance of the information to the user viewing the screen, for example.

The color-scheme appropriateness judgment unit 14 judges the appropriateness of the color-scheme by comparing the value of the importance degree of each color held by the importance degree storage unit 13 with the value of the attractiveness of each color outputted by the attractiveness calculation unit 12. Specifically, the color-scheme appropriateness judgment unit 14 calculates the ordinal rank of each color in the importance degree and in the attractiveness and compares the importance degree ordinal rank with the attractiveness ordinal rank in regard to the same color, for example. Then, the color-scheme appropriateness judgment unit 14 judges that the color is appropriate in the color-scheme if the importance degree ordinal rank and the attractiveness ordinal rank coincide with each other. If the importance degree ordinal rank and the attractiveness ordinal rank do not coincide with each other, the color-scheme appropriateness judgment unit 14 judges that the color is inappropriate in the color-scheme.

When the importance degree ordinal rank and the attractiveness ordinal rank coincide with each other for all the colors, the color-scheme appropriateness judgment unit 14 may also make a judgment by use of a relative attractiveness, in consideration of whether relative magnitude of the importance degree of each color as compared with the importance degrees of the other used colors is comparable to relative magnitude of the attractiveness of the color as compared with the attractiveness of the other used colors. For example, the color-scheme appropriateness judgment unit 14 calculates an attractiveness ratio of each color, by dividing the value of the attractiveness of the color by the value of the importance degree of the color. Then, the color-scheme appropriateness judgment unit 14 compares the attractiveness ratio of the color having the highest importance degree with the attractiveness ratio of each color, and judges each color to be "appropriate" if the two attractiveness ratios are comparable to each other, or to be "inappropriate" otherwise. The judgment on whether the two attractiveness ratios are comparable to each other or not is made based on whether the difference from the attractiveness ratio of the color having the highest attractiveness is within a prescribed value or not, for example. The color-scheme appropriateness judgment unit 14 may make this judgment by using a value other than the attractiveness ratio as long as the judgment is made by use of a relative attractiveness.

The color-scheme appropriateness judgment unit 14 outputs at least the result of the judgment of the color-scheme appropriateness of each color. The color-scheme appropriateness judgment unit 14 may also output the value of the importance degree corresponding to each color and the value of the attractiveness of each color in addition to the color-scheme appropriateness judgment result of each color. Further, the color-scheme appropriateness judgment unit 14 may also output a judgment result regarding the whole screen based on the color-scheme appropriateness judgment results of the colors. The judgment result regarding the whole screen is set at "appropriate" if the color-scheme appropriateness judgment results of the colors are all "appropriate", or set at "inappropriate" otherwise, for example.

The input unit 18 receives operations by the user, such as an operation for designating the evaluation target screen.

The input unit 18 may be implemented by an input device such as a mouse, a keyboard or a touch panel.

The output unit 19 displays the judgment result of each color outputted by the color-scheme appropriateness judgment unit 14. The output unit 19 may be implemented by a display device such as a display.

Figure 2:
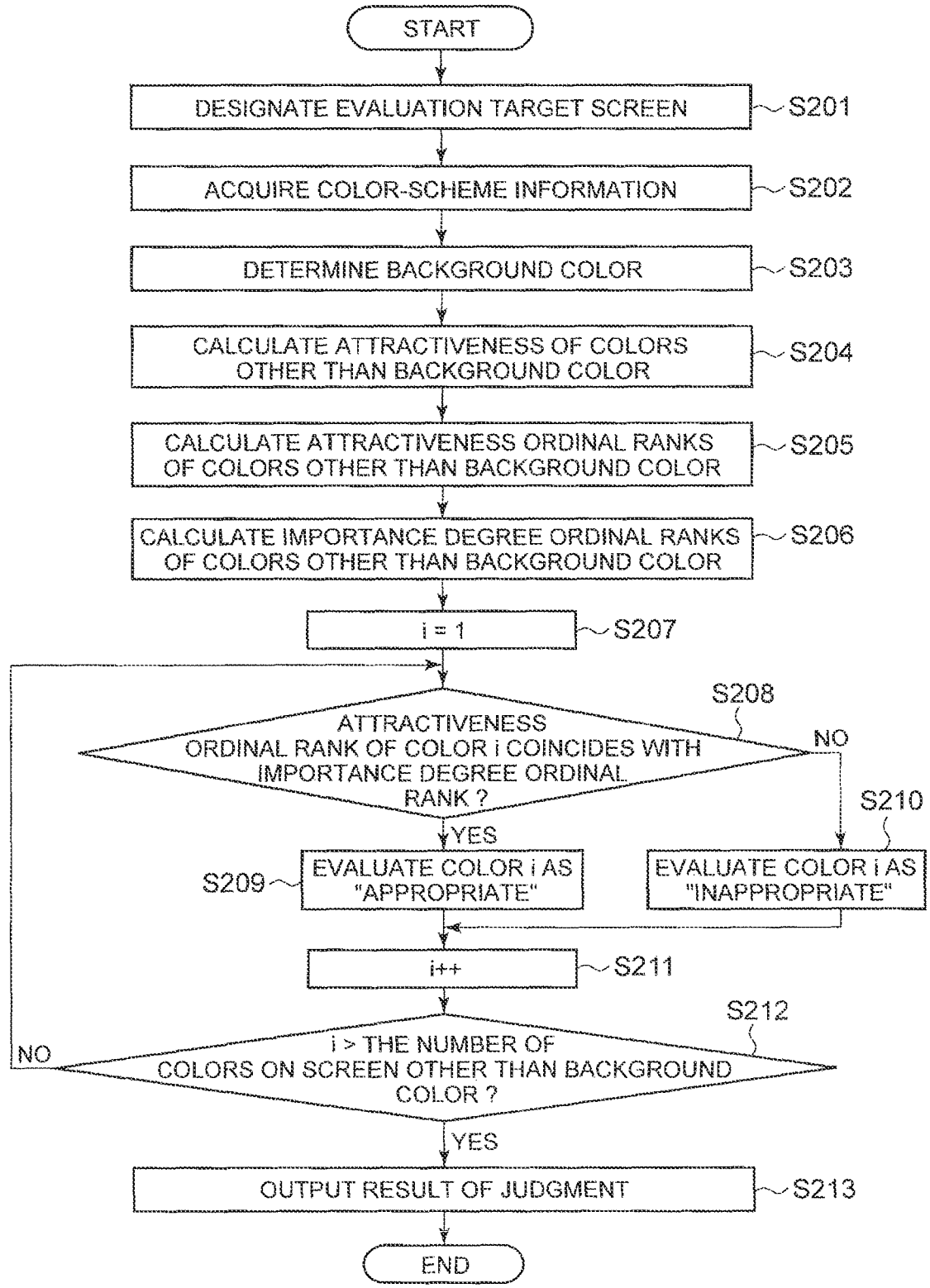
FIG. 2 It depicts the operation of the color-scheme determination device in accordance with the first exemplary embodiment of the present invention.

FIG. 2 is a flow chart showing the operation of the color-scheme determination device 1 of this exemplary embodiment for a color-scheme determination process. The operation for the color-scheme determination process will be explained below referring to FIG. 2.

First, the user designates the evaluation target screen through the input unit 18 (step S201). The color-scheme information acquisition unit 11 acquires the color-scheme information (indicating all colors on the evaluation target screen and the area of each of the colors) from the evaluation target screen (step S202). Further, the color-scheme information acquisition unit 11 determines a color having the largest area as the background color (step S203). Subsequently, by using the color-scheme information and information specifying the background color, the attractiveness calculation unit 12 calculates the attractiveness of the colors other than the background color (step S204).

Subsequently, the color-scheme appropriateness judgment unit 14 calculates the attractiveness ordinal ranks of the colors other than the background color by using the information on the attractiveness of the colors other than the background color (step S205). Further, the color-scheme appropriateness judgment unit 14 calculates the importance degree ordinal ranks of the colors by using the importance degree information (the information on the importance degree which has been set for each color) held by the importance degree storage unit 13 (step S206). Then, the color-scheme appropriateness judgment unit 14 substitutes 1 into a variable i (step S207).

For a color i as the i-th color, the color-scheme appropriateness judgment unit 14 judges whether or not the importance degree ordinal rank of the color i coincides with the attractiveness ordinal rank of the color i (step S208). If the judgment in the step S208 is affirmative (YES), the color-scheme appropriateness judgment unit 14 judges the color i as "appropriate" (step S209). If the judgment in the step S208 is negative (NO), the color-scheme appropriateness judgment unit 14 judges the color i as "inappropriate" (step S210). After the judgment on the color i in the step S209 or S210 is finished, the variable is incremented by 1 (step S211).

Subsequently, the color-scheme appropriateness judgment unit 14 checks whether the judgment is finished for all the colors other than the background color (step S212). Specifically, the color-scheme appropriateness judgment unit 14 in the step S212 judges whether or not i is greater than the number of the colors on the screen other than the background color. If negative (S212: NO), the sequence of the steps S208-S211 is repeated for the incremented variable i. If affirmative (YES) in the step S212, the color-scheme appropriateness judgment unit 14 outputs information including the judgment result to the output unit 19 (step S213). The output unit 19 displays the information including the judgment result. When the step S213 is finished, the color-scheme determination process is ended.

In the above explanation of the operation of the color-scheme determination device with reference to FIG. 2, the judgment on the appropriateness of each color by the color-scheme appropriateness judgment unit 14 is made based on the comparison between the importance degree ordinal rank of the color and the attractiveness ordinal rank of the color (based on whether the two ordinal ranks coincide with each other). However, the aforementioned judgment by use of the relative attractiveness (e.g., the attractiveness ratio), in consideration of whether the relative magnitude of the importance degree of each color as compared with the importance degrees of the other used colors is comparable to the relative magnitude of the attractiveness of the color as compared with the attractiveness of the other used colors, may also be made in addition to the judgment on whether the importance degree ordinal rank and the attractiveness ordinal rank coincide with each other.

Figures 3, 4:
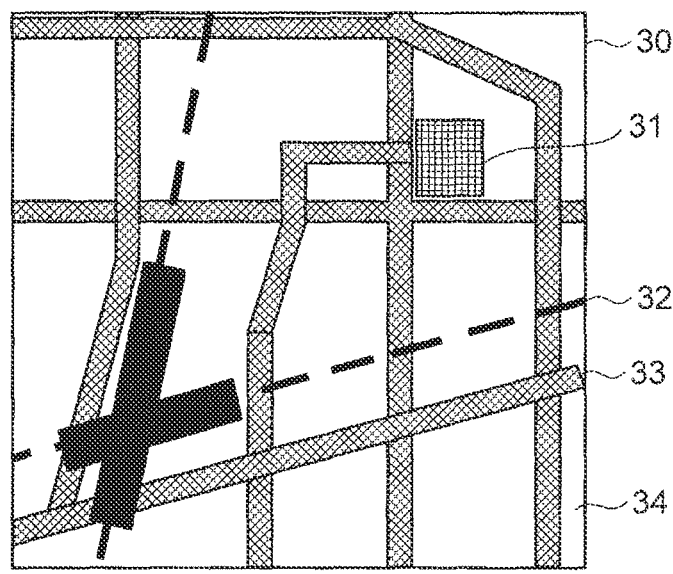
FIG. 3 It depicts an example of an evaluation target screen.
FIG. 4 It depicts an example of a data structure (including colors and areas) outputted by a color-scheme information acquisition unit.

Next, an example of the color-scheme determination device 1 according to the first exemplary embodiment will be described below referring to the flow chart of FIG. 2 and explanatory drawings of FIGS. 3-9. Incidentally, the RGB values in the following explanation are used just as examples, and thus the RGB values do not necessarily coincide with the actual colors in the drawings. FIG. 3 is an explanatory drawing showing an example of the evaluation target screen. On the map 30 shown in FIG. 3, a destination 31, a nearest station and railways 32, roads 33, and the background 34 are displayed in different colors. Therefore, the number of colors used on the map 30 is four. Each color used for each type or piece (hereinafter referred to simply as "type") of information on the map 30 is expressed as an RGB value in this example. For example, a color #FF0000 is used as the color representing the destination 31, a color #0000FF is used as the color representing the nearest station and the railways 32, a color #FF6600 is used as the color representing the roads 33, and a color #FFFFFF is used as the color representing the background 34.

When the map 30 is designated as the evaluation target screen by the user through the input unit 18 (step S201), the color-scheme information acquisition unit 11 acquires information on all the colors used on the map 30 and the area of each of the colors as the color-scheme information (step S202). Further, the color-scheme information acquisition unit 11 determines a color having the largest area as the background color (step S203).

FIG. 4 is an explanatory drawing showing an example of a data structure (including the colors and the areas) outputted by the color-scheme information acquisition unit 11. The "ID" in the data item 41 shown in FIG. 4 represents a serial number of data outputted by the color-scheme information acquisition unit 11. The "COLOR (RGB)" in the data item 42 represents the RGB value of each color on the screen. The "AREA (px)" in the data item 43 represents the number of pixels as the area of each color on the screen. The "ATTRIBUTE" in the data item 44 represents information specifying whether each color is the background color or not. In this example, the color #FFFFFF has been specified as the background color since its area 4900 px is the largest. The "SCREEN" in the data item 45 represents information specifying which screen is the evaluation target screen.

Subsequently, the attractiveness calculation unit 12 calculates the attractiveness of the colors other than the background color by using the color-scheme information on the map 30 and the information specifying the background color outputted by the color-scheme information acquisition unit 11 (step S204). The attractiveness is calculated by adding a characteristic attractiveness (as the degree of attracting visual attention as a single color) and a heterogeneous attractiveness (as the degree of attracting visual attention as compared with other colors used on the same screen) together. The characteristic attractiveness is calculated by using the hue, the saturation and the lightness of the target color. The heterogeneous attractiveness is calculated by using the information on the colors and areas of the colors including the background color. Specifically, the heterogeneous attractiveness is calculated by using the color difference defined as the distance from the average color to each color in the color space.

FIG. 5 is an explanatory drawing showing an example of a data structure (including the attractiveness of the colors) outputted by the attractiveness calculation unit 12. As shown in FIG. 5, the characteristic attractiveness is represented by the data item 51 and the heterogeneous attractiveness is represented by the data item 52. The data item 53 represents the attractiveness of each color as the value calculated by adding the characteristic attractiveness and the heterogeneous attractiveness together. Incidentally, the values of the characteristic attractiveness, the heterogeneous attractiveness and the attractiveness shown in this example are not necessarily those calculated by using the aforementioned expressions (1)-(5).

In this example, the characteristic attractiveness of the colors are calculated as 3.0 for the color #FF0000, 2.7 for the color #0000FF, and 2.3 for the color #FF6600. The heterogeneous attractiveness of the colors are calculated as 1.7 for the color #FF0000, 2.1 for the color #0000FF, and 0.6 for the color #FF6600. Consequently, the attractiveness are calculated as 4.7 for the color #FF0000, 4.8 for the color #0000FF, and 2.9 for the color #FF6600.

By the color-scheme determination device 1 of this example, not only the stand-out degree (the degree of standing out) of each color as a single color but also the stand-out degree of each color in consideration of color balance when the screen is viewed as a whole can be digitized by using the heterogeneous attractiveness as an element of the attractiveness.

When the attractiveness of the colors other than the background color are outputted by the attractiveness calculation unit 12, the color-scheme appropriateness judgment unit 14 sets ordinal ranks to the attractiveness based on the data from the attractiveness calculation unit (step S205). FIG. 6 is an explanatory drawing showing an example of a data structure (including the ordinal ranks of the attractiveness of the colors) generated by the color-scheme appropriateness judgment unit 14. The attractiveness of the colors #FF0000, #0000FF and #FF6600 are 4.7 (second highest), 4.8 (highest) and 2.9 (lowest), Therefore, the ordinal ranks of the attractiveness of the colors #FF0000, #0000FF and #FF6600 shown in the data item 61 are 2, 1 and 3, respectively.

Subsequently, the color-scheme appropriateness judgment unit 14 refers to the importance degree information (the information on the importance degree which has been set for each color) held by the importance degree storage unit 13. FIG. 7 is an explanatory drawing showing an example of a data structure (including the importance degree information on the colors) held by the importance degree storage unit 13. The "ID" in the data item 71 represents a serial number of data held by the importance degree storage unit 13. The "COLOR (RGB)" in the data item 72 represents the RGB value of the color assigned to each type of information. The "IMPORTANCE DEGREE" in the data item 73 represents the degree of importance (importance degree) of the information (to which the color indicated in the same line has been assigned) for the user viewing the map. The value in the data item 73 increases with the increase in the degree of importance. The "MEANING OF INFORMATION" in the data item 74 represents the meaning of the information to which the color indicated in the same line has been assigned.

The calculation of the importance degree indicated in the data item 73 will be explained concretely. It can be considered that the destination is the information having the highest importance degree for the user viewing the map, the nearest station (having a high probability of being the starting point for the user) is of the second highest importance degree, and the information on the roads is of the lowest importance degree. Therefore, the importance degree of the information "DESTINATION" to which the color #FF0000 has been assigned is set at the highest value (e.g., "100"). The importance degree of the information "NEAREST STATION & RAILWAY" to which the color #0000FF has been assigned is set at the second highest value (e.g., "80"). The importance degree of the information "ROAD" to which the color #FF6600 has been assigned is set at the lowest value (e.g., "20").

Subsequently, the color-scheme appropriateness judgment unit 14 sets ordinal ranks to the importance degrees of the colors other than the background color (step S206). FIG. 8 is an explanatory drawing showing an example of a data structure (including the ordinal ranks of the importance degrees of the colors) generated by the color-scheme appropriateness judgment unit 14. The "ORDINAL RANK OF IMPORTANCE DEGREE" in the data item 81 represents the ordinal rank of the importance degree of each color. In the importance degree information held by the importance degree storage unit 13, the importance degree corresponding to the color #FF0000 is the highest (100), the importance degree corresponding to the color #0000FF is the second highest (80), and the importance degree corresponding to the color #FF6600 is the lowest (20) as mentioned above. Therefore, the ordinal ranks of the importance degrees of the colors #FF0000, #0000FF and #FF6600 are 1, 2 and 3, respectively.

Subsequently, the color-scheme appropriateness judgment unit 14 compares the importance degree ordinal rank (the ordinal rank of the importance degree) with the attractiveness ordinal rank (the ordinal rank of the attractiveness) in regard to each color and judges each color as "appropriate" if the two ordinal ranks coincide with each other or as "inappropriate" otherwise (step S207-step S212). FIG. 9 is an explanatory drawing showing an example of a data structure (including the result of the judgment) outputted by the color-scheme appropriateness judgment unit 14. The "JUDGMENT RESULT" in the data item 91 represents the result of the comparison between the importance degree ordinal rank and the attractiveness ordinal rank in regard to each color.

Regarding the color #FF0000, the attractiveness ordinal rank is 2 whereas the importance degree ordinal rank is 1. Since the two ordinal ranks do not coincide with each other, the judgment result in the data item 91 is set at "inappropriate". Regarding the color #0000FF, the attractiveness ordinal rank is 1 whereas the importance degree ordinal rank is 2. Since the two ordinal ranks do not coincide with each other, the judgment result in the data item 91 is set at "inappropriate". Regarding the color #FF6600, both the attractiveness ordinal rank and the importance degree ordinal rank are 3. Since the two ordinal ranks coincide with each other, the judgment result in the data item 91 is set at "appropriate".

Figures 10, 11, 12:
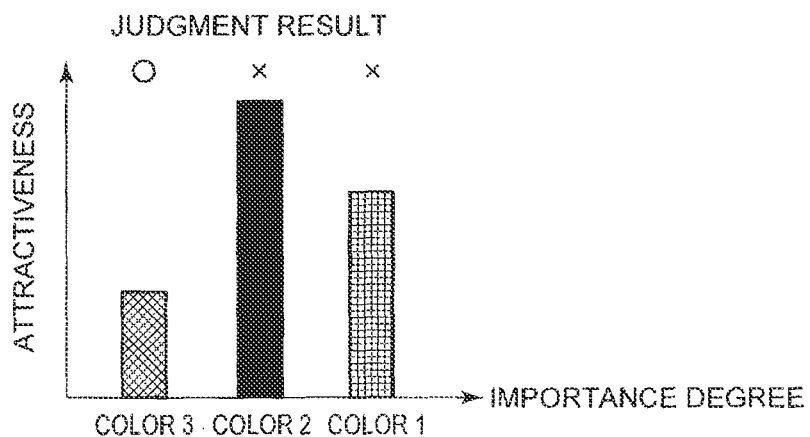
FIG. 10 It depicts an example of a graph (indicating information including judgment result) displayed by an output unit.
FIG. 11 It depicts another example of the data structure (including the importance degree information on the colors) held by the importance degree storage unit.
FIG. 12 It depicts another example of the data structure (including the ordinal ranks of the importance degrees of the colors) generated by the color-scheme appropriateness judgment unit.

The color-scheme appropriateness judgment unit 14 outputs information including the judgment result to the output unit 19 (step S213). The output unit 19 displays the information including the judgment result. FIG. 10 is an explanatory drawing showing an example of a graph (indicating the information including the judgment result) displayed by the output unit 19. The output unit 19 may display the information in various ways (a table like FIG. 9, a graph like FIG. 10, etc.). The user viewing the judgment result, etc. displayed by the output unit 19 can learn whether or not the color-scheme on the evaluation target screen (screen as the target of the judgment) has been made so that each color stands out appropriately corresponding to the ordinal rank of the importance degree of the information.

As above, the color-scheme determination device 1 according to this exemplary embodiment compares the attractiveness ordinal rank (the ordinal rank of the attractiveness) with the importance degree ordinal rank (the ordinal rank of the importance degree) in regard to each color on the screen and judges each color as "appropriate" if the two ordinal ranks coincide with each other or as "inappropriate" if the two ordinal ranks do not coincide with each other. The attractiveness of each color is a value determined in consideration of both the degree of attracting visual attention as a single color and the degree of attracting visual attention as compared with other colors used on the same screen. Therefore, the user is enabled to evaluate whether each type of information on the screen has been colored to stand out appropriately corresponding to the importance degree of the information or not while taking into consideration the color balance when the screen is viewed as a whole. Further, since the judgment result is outputted for each color, the user can evaluate which of the colors used on the screen is inappropriate. Furthermore, the above evaluation can be made even when the user is not an expert in the screen design.

Next, another example of the color-scheme determination device 1 according to the first exemplary embodiment will be described below referring to the flow chart of FIG. 2, FIGS. 4-6, and FIGS. 11-13. In this example, the operation in the steps S201-S205 in FIG. 2 and the output results shown in FIGS. 4-6 are identical with those in the above example, and thus repeated explanation thereof is omitted for brevity.

FIG. 11 is an explanatory drawing showing another example of the data structure (including the importance degree information on the colors) held by the importance degree storage unit 13. The color-scheme appropriateness judgment unit 14 refers to the importance degree information shown in FIG. 11 held by the importance degree storage unit 13. The "ID" in the data item 111 represents a serial number of data held by the importance degree storage unit 13. The "COLOR (RGB)" in the data item 112 represents the RGB value of the color assigned to each type of information. The "IMPORTANCE DEGREE" in the data item 113 represents the degree of importance (importance degree) of the information (to which the color indicated in the same line has been assigned) for the user viewing the map. The value in the data item 113 increases with the increase in the degree of importance. The "MEANING OF INFORMATION" in the data item 114 represents the meaning of the information to which the color indicated in the same line has been assigned. The "SCREEN" in the data item 115 represents information specifying which screen is the evaluation target screen.

In this example, the nearest station (having a high probability of being the starting point for the user) is considered to be the information having the highest importance degree for the user viewing the map 30. Then, the importance degrees have been set based on the idea that the information on the destination is of the next highest importance and the information on the roads is of the lowest importance. Therefore, the importance degree of the information "NEAREST STATION & RAILWAY" to which the color #0000FF has been assigned is set at the highest value "100", the importance degree of the information "DESTINATION" to which the color #FF0000 has been assigned is set at the second highest value "80", and the importance degree of the information "ROAD" to which the color #FF6600 has been assigned is set at the lowest value "20".

The color-scheme appropriateness judgment unit 14 refers to the importance degree information held by the importance degree storage unit 13 and thereby sets the ordinal ranks to the colors (step S206). FIG. 12 is an explanatory drawing showing another example of the data structure (including the ordinal ranks of the importance degrees of the colors) generated by the color-scheme appropriateness judgment unit 14. The "ORDINAL RANK OF IMPORTANCE DEGREE" in the data item 121 represents the ordinal rank of the importance degree of each color. In the importance degree information held by the importance degree storage unit 13, the importance degree corresponding to the color #0000FF is the highest (100), the importance degree corresponding to the color #FF0000 is the second highest (80), and the importance degree corresponding to the color #FF6600 is the lowest (20). Therefore, the ordinal ranks of the importance degrees of the colors #FF0000, #0000FF and #FF6600 are 2, 1 and 3, respectively.

Subsequently, the color-scheme appropriateness judgment unit 14 compares the importance degree ordinal rank (the ordinal rank of the importance degree) with the attractiveness ordinal rank (the ordinal rank of the attractiveness) in regard to each color (step S207-step S212). In this example, the importance degree ordinal rank coincides with the attractiveness ordinal rank in regard to all of the colors. In this case where the importance degree ordinal rank and the attractiveness ordinal rank coincide with each other for all of the colors, the color-scheme appropriateness judgment unit 14 may calculate the attractiveness ratio (obtained by dividing the value of the attractiveness by the value of the importance degree) for each color. In this case, the color-scheme appropriateness judgment unit 14 makes a judgment on the appropriateness of the color-scheme based on whether the attractiveness ratio of each color is comparable to the attractiveness ratio of the color having the highest importance degree, and outputs the result of the judgment. For example, the color-scheme appropriateness judgment unit 14 judges whether the difference from the attractiveness ratio of the color having the highest attractiveness is within a prescribed value or not and sets the judgment result at "appropriate" if the difference is within the prescribed value or at "inappropriate" otherwise. The color-scheme appropriateness judgment unit 14 outputs the judgment result to the output unit 19 (step S213).

The judgment result regarding the color-scheme appropriateness may be expressed as, for example, evaluation values of the colors each of which is obtained by converting the attractiveness ratio of each color in a way in which the attractiveness ratio of the color having the highest importance degree becomes 100. In this case, a color having an evaluation value closer to 100 can be considered to have been judged to have higher color-scheme appropriateness. When the evaluation value of a color is higher than 100, the color can be considered to have a high attractiveness as compared with the value of the importance degree. In contrast, a color having a low evaluation value can be considered to have a low attractiveness as compared with the value of the importance degree.

FIG. 13 is an explanatory drawing showing another example of the data structure (including the result of the judgment) outputted by the color-scheme appropriateness judgment unit 14. The "ORDINAL RANK COINCIDENCE" in the data item 131 represents whether or not the importance degree ordinal rank and the attractiveness ordinal rank coincide with each other. The "EYE-CATCHING DEGREE RATIO" in the data item 132 represents the value of the attractiveness ratio of each color. The "JUDGMENT RESULT" in the data item 133 represents the result of the final judgment on the color-scheme appropriateness made based on the attractiveness ratio.

It is assumed in this example that the color-scheme appropriateness judgment unit 14 judges that the color-scheme for a color is appropriate if the attractiveness ratio of the color is within ±25% of the attractiveness ratio of the color having the highest importance degree. Since the attractiveness ratio of the color #0000FF having the highest importance degree is 0.048, the color-scheme for a color is judged to be "APPROPRIATE" if the attractiveness ratio of the color is 0.036 or more and 0.060 or less (0.048±25%), or to be "INAPPROPRIATE" otherwise. Thus, the judgment results for the colors #FF0000 (attractiveness ratio: 0.059) and #0000FF (attractiveness ratio: 0.048) are "APPROPRIATE", #FF6600 (attractiveness ratio: 0.145) is "INAPPROPRIATE", respectively.

A color having a high attractiveness ratio can be considered to be a color to which the magnitude of the attractiveness as compared with the value of the importance degree has been set high. In contrast, a color having a low attractiveness ratio can be considered to be a color to which the magnitude of the attractiveness as compared with the value of the importance degree has been set low. Therefore, the color-scheme determination device 1 in this exemplary embodiment is capable of not only judging whether the stand-out degree (the degree of standing out) of each color coincides with the ordinal rank of the importance degree of the color or not but also judging whether the stand-out degree of each color coincides also with the magnitude of the importance degree of the color to some extent or not by making the above-described judgment based on the attractiveness ratio.

Subsequently, the color-scheme appropriateness judgment unit 14 outputs the judgment result regarding each color to the output unit 19. The output unit 19 displays the judgment result. The output unit 19 may display the judgment result in various methods (a table like FIG. 13, a graph, etc.).

Incidentally, while the color-scheme determination device 1 of this exemplary embodiment calculates the attractiveness of the used colors other than the background color by use of the background color as a color having the largest area or a color specified by the user, appropriateness of the background color is not handled as an object of the judgment. However, the color-scheme determination device 1 of this exemplary embodiment may make the appropriateness judgment also on the background color (e.g., judgment on whether a color that is not eye-friendly (with saturation exceeding a prescribed value) is used for the background or not) and present the result of the judgment.

As descried above, in the color-scheme determination device 1 according to this exemplary embodiment, the color-scheme appropriateness judgment unit 14 judges whether each color used on the screen has been colored (set) to stand out appropriately corresponding to the importance degree or not by comparing the stand-out degree of each color when the screen is viewed as a whole with the magnitude of the importance degree which has been set corresponding to each color. Therefore, even a user not having expert knowledge of colors and design is enabled to evaluate whether each type of information on the screen has been colored to stand out appropriately corresponding to the importance degree of the information or not while taking into consideration the color balance when the screen is viewed as a whole. Further, since the judgment result about the color-scheme appropriateness is displayed for each color used on the screen, the user can learn which of the colors used on the screen is inappropriate.

Furthermore, the color-scheme determination device 1 of this exemplary embodiment makes the comparison between the attractiveness ordinal rank and the importance degree ordinal rank in regard to each color on the screen, and further makes the judgment using the attractiveness ratio when the two ordinal ranks coincide with each other for all of the colors. Therefore, the user can make the judgment on whether each type of information on the screen has been colored to stand out appropriately corresponding to the importance degree of the information or not based on not only whether the stand-out degree (the degree of standing out) of each color coincides with the ordinal rank of the importance degree of the color or not but also whether the stand-out degree of each color coincides also with the magnitude of the importance degree of the color to some extent or not.

<Second Exemplary Embodiment>

Figure 14:
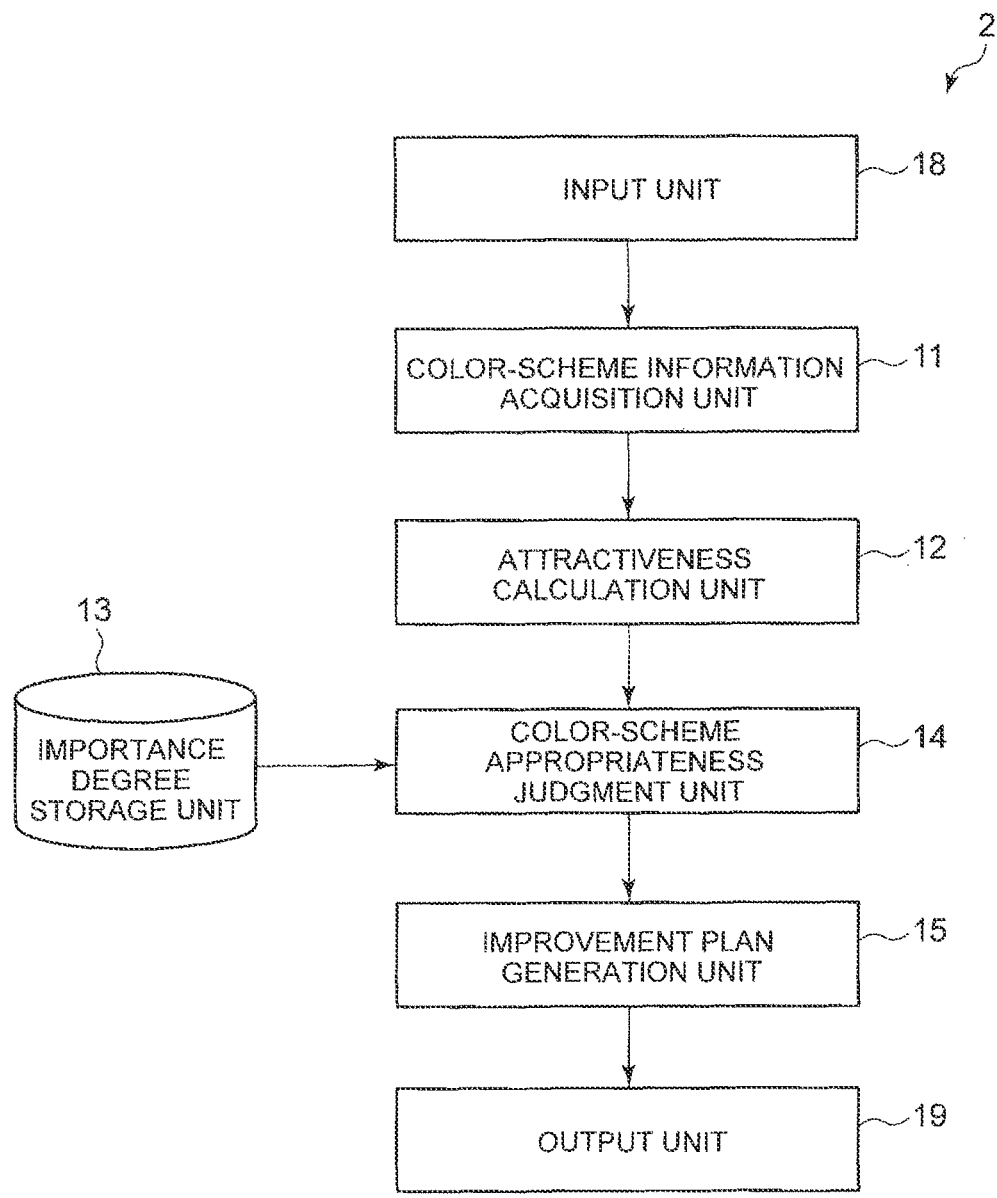
FIG. 14 It depicts the configuration of a color-scheme determination device in accordance with a second exemplary embodiment of the present invention.

A color-scheme determination device in accordance with a second exemplary embodiment (exemplary embodiment 2) of the present invention will be described in detail below referring to figures. FIG. 14 is a block diagram showing the configuration of the color-scheme determination device 2 in accordance with the second exemplary embodiment of the present invention. In the following explanation, components equivalent to those in the color-scheme determination device 1 of the first exemplary embodiment shown in FIG. 1 are assigned the same reference characters as in FIG. 1 and repeated explanation thereof is omitted for brevity.

As shown in FIG. 14, the color-scheme determination device 2 of this exemplary embodiment comprises an improvement plan generation unit 15, which is the difference from the color-scheme determination device 1 of the first exemplary embodiment shown in FIG. 1. The other components of the color-scheme determination device 2 are equivalent to those of the color-scheme determination device 1 of the first exemplary embodiment.

The improvement plan generation unit 15 generates an improvement plan (in which the colors judged to be "inappropriate" have been changed) by referring to the judgment result about the color-scheme appropriateness of each color, the value of the importance degree of each color, and the value of the attractiveness of each color outputted by the color-scheme appropriateness judgment unit 14. Specifically, the improvement plan generation unit 15 generates an improvement plan in which the colors judged to be "inappropriate" have been interchanged, for example. The interchanging of the colors judged to be "inappropriate" is performed in a way in which the importance degree ordinal rank and the attractiveness ordinal rank coincide with each other for each of the colors. After finishing generating the improvement plan, the improvement plan generation unit 15 outputs data of the improvement plan, in which the color-scheme before the improvement and the color-scheme in the improvement plan are associated with each other, to the output unit 19. Any color notation method may be used for representing each color as long as the color can be uniquely determined. For example, an RGB value using hexadecimal numbers (e.g., "#FF0000") is used.

Figure 15:
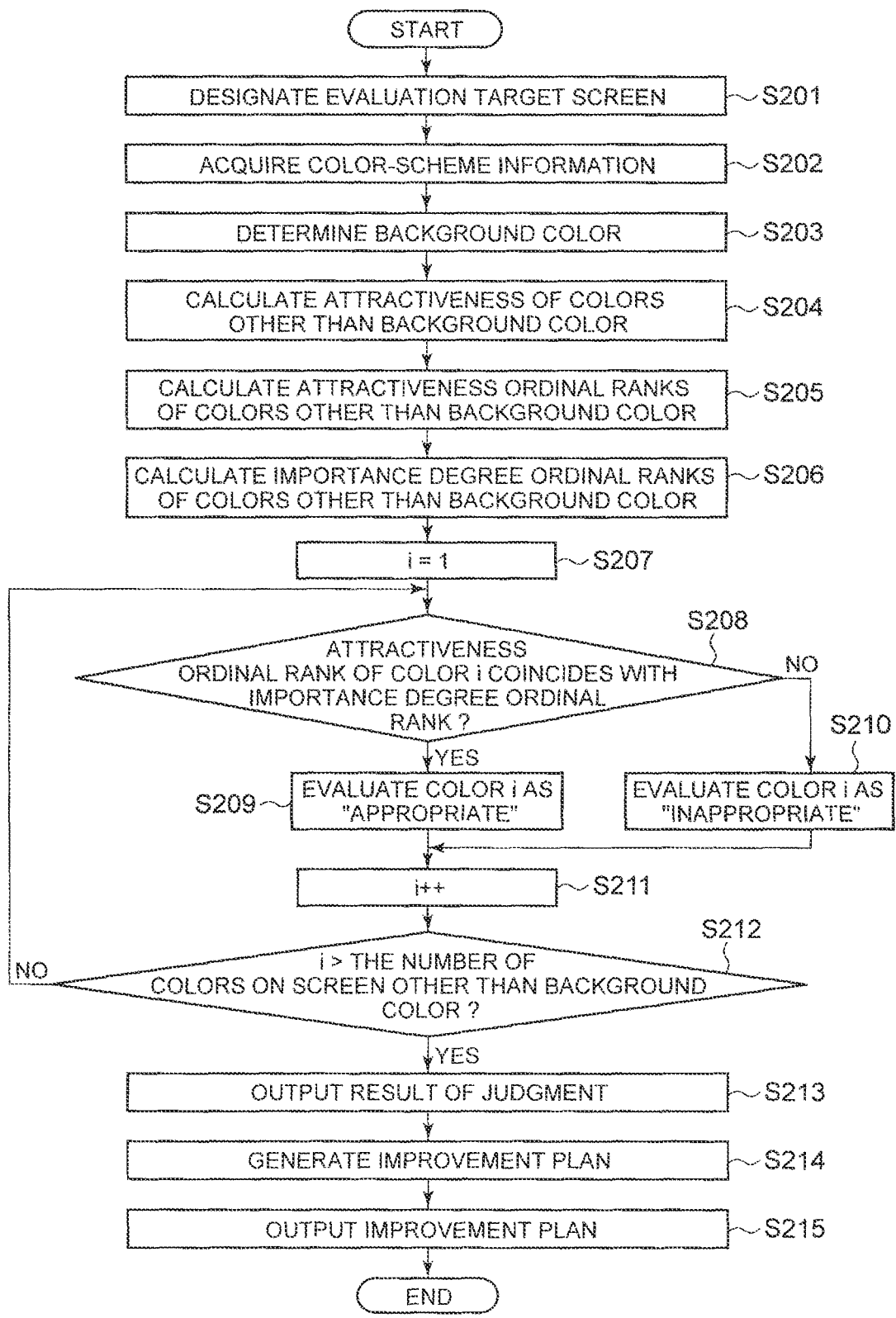
FIG. 15 It depicts the operation of a color-scheme determination process and an improvement plan generation process executed by the color-scheme determination device according to the second exemplary embodiment.

FIG. 15 is a flow chart showing the operation of the color-scheme determination process and the improvement plan generation process executed by the color-scheme determination device 2 according to the second exemplary embodiment of the present invention. The operation of the color-scheme determination process and the improvement plan generation process will be explained below by referring to FIG. 15, wherein operations (steps) equivalent to those in the first exemplary embodiment shown in FIG. 2 are assigned the same reference characters as in FIG. 2 and repeated explanation thereof is omitted for brevity.

In the color-scheme determination process in the second exemplary embodiment, after the judgment result is outputted by the color-scheme appropriateness judgment unit (step S213), the improvement plan generation unit 15 generates the improvement plan through the color change (step S214) and outputs the generated improvement plan to the output unit 19 (step S215). Steps other than the steps S214 and S215 are equivalent to those in the first exemplary embodiment.

Next, an example of the color-scheme determination device 2 according to the second exemplary embodiment will be described below referring to a flow chart of FIG. 15 and FIG. 16. It is assumed that the table shown in FIG. 9 has been outputted by the color-scheme appropriateness judgment unit 14 as the judgment result about the color-scheme appropriateness of the map 30 designated as the evaluation target screen. The improvement plan generation unit 15 generates the improvement plan regarding the color-scheme by using the judgment result outputted by the color-scheme appropriateness judgment unit 14 (step S214). Specifically, the improvement plan generation unit 15 generates an improvement plan in which the colors judged to be "inappropriate" by the color-scheme appropriateness judgment unit 14 have been changed. Since the colors #FF0000 and #0000FF have been judged to be "inappropriate" in this example, the improvement plan generation unit 15 makes the adjustment (in a way in which the attractiveness ordinal ranks and the importance degree ordinal ranks of the colors coincide with each other) by changing the two colors. The coincidence between the importance degree ordinal ranks and the attractiveness ordinal ranks can be achieved by interchanging the assignments of the two colors since the importance degree ordinal rank and the attractiveness ordinal rank of the color #FF0000 are 1 and 2 and those of the color #0000FF are 2 and 1.

FIG. 16 is an explanatory drawing showing an example of a data structure (including the contents of the improvement) outputted by the improvement plan generation unit 15. The "COLOR (RGB) IN ORIGINAL PLAN" in the data item 161 represents each color originally used in the evaluation target screen. The "COLOR (RGB) IN IMPROVEMENT PLAN" in the data item 162 represents each color used in the improvement plan generated by the improvement plan generation unit 15. In this example, a color-scheme improvement plan for changing the color of the part having the color #FF0000 in the original plan to the color #0000FF and changing the color of the part having the color #0000FF in the original plan to the color #FF0000 is generated. The color #FF6600 in the original plan is not changed since the judgment result outputted by the color-scheme appropriateness judgment unit 14 for the color #FF6600 was "appropriate". The "SCREEN" in the data item 163 represents information specifying the evaluation target screen.

The improvement plan generation unit 15 outputs the contents of the generated improvement plan to the output unit 19 (step S215). The output unit 19 displays the outputted contents of the improvement plan. The contents of the improvement plan displayed by the output unit 19 may either be a table like the one shown in FIG. 16 or a screen generated by changing the color-scheme in the evaluation target screen according to the improvement plan.

As described above, the color-scheme determination device 2 according to this exemplary embodiment not only makes the color-scheme appropriateness judgment on the evaluation target screen but also presents the improvement plan, indicating an appropriate way of changing colors in the evaluation target screen that leads to a color-scheme achieving the coincidence between the attractiveness ordinal ranks and the importance degree ordinal ranks, to the user of the system. This allows the user of the system not only to evaluate the color-scheme but also to build the improvement plan.

Next, another example of the color-scheme determination device 2 according to the second exemplary embodiment will be described below referring to the flow chart of FIG. 15 and FIG. 17. FIG. 17 is an explanatory drawing showing another example of the data structure (including the contents of the improvement) outputted by the improvement plan generation unit 15.

Similarly to the above example, it is assumed that the table shown in FIG. 9 has been outputted by the color-scheme appropriateness judgment unit 14 as the judgment result about the color-scheme appropriateness of the map 30 designated as the evaluation target screen. The improvement plan generation unit 15 generates the improvement plan regarding the color-scheme by using the evaluation result outputted by the color-scheme appropriateness judgment unit 14 (step S214). Specifically, the improvement plan generation unit 15 generates an improvement plan in which the colors judged to be "inappropriate" by the color-scheme appropriateness judgment unit 14 have been changed.

It is assumed in this example that no major change in the tint is allowed for the information "DESTINATION", "NEAREST STATION & RAILWAY" and "ROAD" on the map 30 (evaluation target screen) in order to maintain the display consistency with other maps. In this case, the generation of the improvement plan that interchanges the colors judged to be "inappropriate" (as in the policy in the above example) can be considered to be inappropriate. Therefore, adjustment of the attractiveness is made in this example by changing at least one of the saturation and the lightness while substantially maintaining the tint by maintaining the hue.

In the adjustment of the attractiveness in this example, the improvement plan generation unit 15 changes one of the saturation and the lightness by a prescribed value, for example. Since the colors #FF0000 and #0000FF have been judged to be "inappropriate" in this example, the improvement plan generation unit 15 makes adjustment so that the attractiveness ordinal ranks and the importance degree ordinal ranks coincide with each other by changing the saturation or the lightness of the two colors by prescribed values. The improvement plan generation unit 15 adjusts the color #FF0000 so as to increase its attractiveness since the importance degree ordinal rank and the attractiveness ordinal rank of the color #FF0000 are 1 and 2, respectively. The improvement plan generation unit 15 adjusts the color #0000FF so as to decrease its attractiveness since the importance degree ordinal rank and the attractiveness ordinal rank of the color #0000FF are 2 and 1, respectively.

FIG. 17 is an explanatory drawing showing another example of the data structure (including the contents of the improvement) outputted by the improvement plan generation unit 15. In this example, the improvement plan generation unit 15 generates the improvement plan by changing the color of the part having the color #FF0000 in the original plan to the color #FF1919 (by increasing the lightness by 5) and changing the color of the part having the color #0000FF in the original plan to the color #0707F9 (by decreasing the saturation by 5). The color #FF6600 in the original plan is not changed since the judgment result about the color-scheme appropriateness of the color #FF6600 was "appropriate". The improvement plan generation unit 15 outputs the contents of the generated improvement plan to the output unit 19 (step S215). The output unit 19 displays the improvement plan. The output unit 19 may display either a table like the one shown in FIG. 13 or a screen generated by changing the color-scheme in the evaluation target screen according to the improvement plan.

The color-scheme determination device 2 of this exemplary embodiment may perform the attractiveness calculation by the attractiveness calculation unit 12 and the color-scheme appropriateness judgment by the color-scheme appropriateness judgment unit 14 also on the screen colored according to the improvement plan generated by the improvement plan generation unit 15, by having the color-scheme information acquisition unit 11 input the screen as the next evaluation target screen. This operation allows the color-scheme determination device 2 to verify whether the color-scheme in the improvement plan is appropriate or not. In this case, the color-scheme determination device 2 may repeat the generation of the improvement plan by the improvement plan generation unit 15 and the judgment by the color-scheme appropriateness judgment unit 14 until all the colors used in the improvement plan are judged to be appropriate.

As described above, the color-scheme determination device 2 according to this exemplary embodiment evaluates whether each type of information on the screen has been colored to stand out appropriately corresponding to the importance degree of the information or not while taking into consideration the color balance when the screen is viewed as a whole, and further outputs an improvement plan in which the color-scheme has been changed based on the result of the evaluation. Therefore, even a user not having knowledge of colors and design is enabled to build an improvement plan in which a change has been made in each color not standing out appropriately corresponding to the importance degree of the information on the screen.

The color-scheme determination device 2 of this exemplary embodiment generates an improvement plan in which the attractiveness has been adjusted (by changing the saturation and the lightness, for example) for each color not standing out appropriately corresponding to the importance degree when the screen is viewed as a whole. Since it becomes possible to make the adjustment of the attractiveness while maintaining the tint by maintaining the hue, the color-scheme determination device 2 of this exemplary embodiment is usable also for screens on which a meaning is attached to a certain tint (e.g., cases where a reddish color is used for warning information).

Further, the color-scheme determination device 2 of this exemplary embodiment is also capable of verifying the appropriateness of the generated improvement plan in cases where the screen colored according to the improvement plan is inputted as the next evaluation target screen by the color-scheme information acquisition unit 11. Therefore, the user is enabled to build an appropriate coloration plan (in which each type of information on the screen is colored to stand out appropriately corresponding to the importance degree of the information) with higher precision.

The above exemplary embodiments have also disclosed the following color-scheme determination devices (1)-(7):

(1) A color-scheme determination device (e.g., the color-scheme determination device 1 or 2) comprising: an input unit (e.g., the input unit 18) which receives designation of an evaluation target screen by a user; a color-scheme information acquisition unit (e.g., the color-scheme information acquisition unit 11) which acquires color-scheme information including data regarding all colors used for information displayed on the evaluation target screen; an attractiveness calculation unit (e.g., the attractiveness calculation unit 12) which calculates an attractiveness, representing the degree of attracting visual attention, in regard to each of the used colors by using the color-scheme information; an importance degree storage unit (e.g., the importance degree storage unit 13) which holds importance degree information representing a relative degree of importance of each of the used colors and corresponding to information for which each of the used colors is used; a color-scheme appropriateness judgment unit (e.g., the color-scheme appropriateness judgment unit 14) which calculates ordinal rank of the importance degree information associated with each of the used colors based on the magnitude of the importance degree information, calculates ordinal rank of the attractiveness associated with each of the used colors based on the magnitude of the attractiveness, and outputs a judgment result indicating whether or not the ordinal rank of the importance degree information associated with each of the used colors coincides with the ordinal rank of the attractiveness associated with the used color; and an output unit (the output unit 19) which displays the judgment result.

(2) The color-scheme information includes the area of information displayed on the evaluation target screen. The attractiveness calculation unit calculates a heterogeneous attractiveness, as the degree of attracting visual attention as compared with other colors used on the evaluation target screen, in regard to each of the used colors by using the color-scheme information and calculates an attractiveness including the heterogeneous attractiveness.

With such a color-scheme determination device, the heterogeneous attractiveness can be calculated precisely since the heterogeneous attractiveness is calculated by using the areas. Further, since the attractiveness including the heterogeneous attractiveness is calculated, it is possible to determine an attractiveness in consideration of the degree of attracting visual attention as compared with other colors.

(3) The color-scheme information includes the area of information displayed on the evaluation target screen. The color-scheme information acquisition unit determines a background color as one of the used colors that is used for information having the largest area among the information displayed on the evaluation target screen. The attractiveness calculation unit calculates the attractiveness representing the degree of attracting visual attention in regard to each of the colors used for the information on the evaluation target screen by using information specifying the background color.

With such a color-scheme determination device, the heterogeneous attractiveness can be calculated more precisely through the calculation of the attractiveness in consideration of the background color.

(4) When the ordinal rank of the importance degree information coincides with the ordinal rank of the attractiveness in regard to all the colors used on the evaluation target screen, the color-scheme appropriateness judgment unit calculates a relative attractiveness, as an index for judging difference between relative magnitude of the importance degree as compared with the importance degrees of the other used colors and relative magnitude of the attractiveness as compared with the attractiveness of the other used colors, in regard to each of the used colors by using the values of the attractiveness and the values of the importance degree, and judges whether the difference is within a prescribed value or not.

With such a color-scheme determination device, it is possible not only to judge whether the stand-out degree (the degree of standing out) of each color coincides with the ordinal rank of the importance degree of the color or not but also to judge whether the stand-out degree of each color coincides also with the magnitude of the importance degree of the color to some extent or not.

(5) The color-scheme determination device (e.g., the color-scheme determination device 2) may be configured to comprise an improvement plan generation unit (e.g., the improvement plan generation unit 15). When there exists a used color for which the ordinal rank of the importance degree and the ordinal rank of the attractiveness do not coincide with each other, the improvement plan generation unit generates an improvement plan indicating a color-scheme in which the used color has been changed so that the ordinal rank of the importance degree and the ordinal rank of the attractiveness coincide with each other.

With such a color-scheme determination device, even a user not having knowledge of colors and design is enabled to build an improvement plan in which a change has been made in each color not standing out appropriately corresponding to the importance degree of the information on the screen.

(6) When there exist used colors for which the ordinal rank of the importance degree and the ordinal rank of the attractiveness do not coincide with each other, the improvement plan generation unit generates an improvement plan indicating a color-scheme in which the used colors have been interchanged so that the ordinal rank of the importance degree and the ordinal rank of the attractiveness coincide with each other.

(7) When there exists a used color for which the ordinal rank of the importance degree and the ordinal rank of the attractiveness does not coincide with each other, the improvement plan generation unit generates an improvement plan indicating a color-scheme in which at least saturation or lightness of the used color has been adjusted without changing hue of the used color so that the ordinal rank of the importance degree and the ordinal rank of the attractiveness coincide with each other.

With such a color-scheme determination device, it becomes possible to make the adjustment of the attractiveness while maintaining the tint by maintaining the hue. Therefore, the color-scheme determination device is usable also in cases where a meaning is attached to a particular tint (e.g., cases where a reddish color is used for warning information).

This application claims priority to Japanese Patent Application No. 2012-43638 filed on Feb. 29, 2012, the entire disclosure of which is incorporated herein by reference.

While the present invention has been described above with reference to the exemplary embodiments (and examples), the present invention is not to be restricted to the particular illustrative exemplary embodiments (and examples). A variety of modifications understandable to those skilled in the art can be made to the configuration and details of the present invention within the scope of the present invention.

INDUSTRIAL APPLICABILITY

The present invention is applicable to determination/judgment of color-schemes of maps.

REFERENCE SIGNS LIST 11 color-scheme information acquisition unit
12 attractiveness calculation unit
13 importance degree storage unit
14 color-scheme appropriateness judgment unit
15 improvement plan generation unit
18 input unit
19 output unit

The invention claimed is:

1. A color-scheme determination device comprising at least one processor configured to control the device to:
  receive designation of an evaluation target screen by a user;
  acquire color-scheme information including data regarding all colors used for information displayed on the evaluation target screen;
  calculate an attractiveness, representing the degree of attracting visual attention, in regard to each of the used colors by using the color-scheme information;
  hold importance degree information representing a relative degree of importance of each of the used colors and corresponding to the information for which each of the used colors is used;
  calculate ordinal rank of the importance degree associated with each of the used colors based on the magnitude of the importance degree information, calculate ordinal rank of the attractiveness associated with each of the used colors based on the magnitude of the attractiveness, and output a judgment result indicating whether or not the ordinal rank of the importance degree associated with each of the used colors coincides with the ordinal rank of the attractiveness associated with the used color; and
  display the judgment result.

2. The color-scheme determination device according to claim 1, wherein:
  the color-scheme information includes an area of the information displayed on the evaluation target screen, and
  the at least one processor is configured to calculate a heterogeneous attractiveness, as the degree of attracting visual attention as compared with other colors used on the evaluation target screen, in regard to each of the used colors by using the color-scheme information and calculate an attractiveness including the heterogeneous attractiveness.

3. The color-scheme determination device according to claim 2, wherein:
  the at least one processor is configured to
  determine a background color as one of the used colors that is used for information having the largest area among the information displayed on the evaluation target screen, and
  calculate the attractiveness representing the degree of attracting visual attention in regard to each of the colors used for the information on the evaluation target screen by using information specifying the background color.

4. The color-scheme determination device according to claim 3, wherein when the ordinal rank of the importance degree coincides with the ordinal rank of the attractiveness in regard to all the colors used on the evaluation target screen, the at least one processor is configured to calculate a relative attractiveness, as an index for judging difference between relative magnitude of the importance degree as compared with the importance degrees of the other used colors and relative magnitude of the attractiveness as compared with the attractiveness of the other used colors, in regard to each of the used colors by using the values of the attractiveness and the values of the importance degree, and judge whether the difference is within a prescribed value or not.

5. The color-scheme determination device according to claim 3, wherein the at least one more processor is configured to:
  when there exists a used color for which the ordinal rank of the importance degree and the ordinal rank of the attractiveness do not coincide with each other, generate an improvement plan indicating a color-scheme in which the used color has been changed so that the ordinal rank of the importance degree and the ordinal rank of the attractiveness coincide with each other.

6. The color-scheme determination device according to claim 5, wherein when there exist used colors for which the ordinal rank of the importance degree and the ordinal rank of the attractiveness do not coincide with each other, the at least one processor is configured to generate an improvement plan indicating a color-scheme in which the used colors have been interchanged so that the ordinal rank of the importance degree and the ordinal rank of the attractiveness coincide with each other.

7. The color-scheme determination device according to claim 2, wherein when the ordinal rank of the importance degree coincides with the ordinal rank of the attractiveness in regard to all the colors used on the evaluation target screen, the at least one processor is configured to calculate a relative attractiveness, as an index for judging difference between relative magnitude of the importance degree as compared with the importance degrees of the other used colors and relative magnitude of the attractiveness as compared with the attractiveness of the other used colors, in regard to each of the used colors by using the values of the attractiveness and the values of the importance degree, and judge whether the difference is within a prescribed value or not.

8. The color-scheme determination device according to claim 2, wherein the at least one processor is configured to:
  when there exists a used color for which the ordinal rank of the importance degree and the ordinal rank of the attractiveness do not coincide with each other, generate an improvement plan indicating a color-scheme in which the used color has been changed so that the ordinal rank of the importance degree and the ordinal rank of the attractiveness coincide with each other.

9. The color-scheme determination device according to claim 8, wherein when there exist used colors for which the ordinal rank of the importance degree and the ordinal rank of the attractiveness do not coincide with each other, the at least one processor is configured to generate an improvement plan indicating a color-scheme in which the used colors have been interchanged so that the ordinal rank of the importance degree and the ordinal rank of the attractiveness coincide with each other.

10. The color-scheme determination device according to claim 1, wherein:

the color-scheme information includes an area of the information displayed on the evaluation target screen, and the at least one processor is configured to determine a background color as one of the used colors that is used for information having the largest area among the information displayed on the evaluation target screen, and calculate the attractiveness representing the degree of attracting visual attention in regard to each of the colors used for the information on the evaluation target screen by using information specifying the background color.

11. The color-scheme determination device according to claim 10, wherein when the ordinal rank of the importance degree coincides with the ordinal rank of the attractiveness in regard to all the colors used on the evaluation target screen, the at least one processor is configured to calculate a relative attractiveness, as an index for judging difference between relative magnitude of the importance degree as compared with the importance degrees of the other used colors and relative magnitude of the attractiveness as compared with the attractiveness of the other used colors, in regard to each of the used colors by using the values of the attractiveness and the values of the importance degree, and judge whether the difference is within a prescribed value or not.

12. The color-scheme determination device according to claim 10, wherein the at least one processor is configured to:
when there exists a used color for which the ordinal rank of the importance degree and the ordinal rank of the attractiveness do not coincide with each other, generate an improvement plan indicating a color-scheme in which the used color has been changed so that the ordinal rank of the importance degree and the ordinal rank of the attractiveness coincide with each other.

13. The color-scheme determination device according to claim 12, wherein when there exist used colors for which the ordinal rank of the importance degree and the ordinal rank of the attractiveness do not coincide with each other, the at least one processor is configured to generate an improvement plan indicating a color-scheme in which the used colors have been interchanged so that the ordinal rank of the importance degree and the ordinal rank of the attractiveness coincide with each other.

14. The color-scheme determination device according to claim 1, wherein when the ordinal rank of the importance degree coincides with the ordinal rank of the attractiveness in regard to all the colors used on the evaluation target screen, the at least one processor is configured to calculate a relative attractiveness, as an index for judging difference between relative magnitude of the importance degree as compared with the importance degrees of the other used colors and relative magnitude of the attractiveness as compared with the attractiveness of the other used colors, in regard to each of the used colors by using the values of the attractiveness and the values of the importance degree, and judge whether the difference is within a prescribed value or not.

15. The color-scheme determination device according to claim 14, wherein the at least one processor is configured to:
when there exists a used color for which the ordinal rank of the importance degree and the ordinal rank of the attractiveness do not coincide with each other, generate an improvement plan indicating a color-scheme in which the used color has been changed so that the ordinal rank of the importance degree and the ordinal rank of the attractiveness coincide with each other.

16. The color-scheme determination device according to claim 1, wherein the at least one processor is configured to:
when there exists a used color for which the ordinal rank of the importance degree and the ordinal rank of the attractiveness do not coincide with each other, generate an improvement plan indicating a color-scheme in which the used color has been changed so that the ordinal rank of the importance degree and the ordinal rank of the attractiveness coincide with each other.

17. The color-scheme determination device according to claim 16, wherein when there exist used colors for which the ordinal rank of the importance degree and the ordinal rank of the attractiveness do not coincide with each other, the at least one processor is configured to generate an improvement plan indicating a color-scheme in which the used colors have been interchanged so that the ordinal rank of the importance degree and the ordinal rank of the attractiveness coincide with each other.

18. The color-scheme determination device according to claim 16, wherein when there exists a used color for which the ordinal rank of the importance degree and the ordinal rank of the attractiveness does not coincide with each other, the at least one processor is configured to generate an improvement plan indicating a color-scheme in which at least saturation or lightness of the used color has been adjusted without changing hue of the used color so that the ordinal rank of the importance degree and the ordinal rank of the attractiveness coincide with each other.

19. A non-transitory computer readable information recording medium storing a color-scheme determination program that, when executed by a processor, performs a method for:
receiving designation of an evaluation target screen by a user;
acquiring color-scheme information including data regarding all colors used for information displayed on the evaluation target screen;
calculating an attractiveness, representing the degree of attracting visual attention, in regard to each of the used colors by using the color-scheme information;
holding importance degree information representing a relative degree of importance of each of the used colors and corresponding to information for which each of the used colors is used;
calculating ordinal rank of the importance degree associated with each of the used colors based on the magnitude of the importance degree information, calculating ordinal rank of the attractiveness associated with each of the used colors based on the magnitude of the attractiveness, and outputting a judgment result indicating whether or not the ordinal rank of the importance degree associated with each of the used colors coincides with the ordinal rank of the attractiveness associated with the used color; and
displaying the judgment result.

* * * * *